United States Patent
Nakagaki (10) Patent No.: US 10,887,183 B1
(45) Date of Patent: Jan. 5, 2021

(54) SYSTEM AND METHOD FOR TOPOLOGICAL REDUNDANCY

(71) Applicant: Virtustream IP Holding Company LLC, Bethesda, MD (US)

(72) Inventor: K. Chris Nakagaki, Atlanta, GA (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 0 days.

(21) Appl. No.: 16/575,289

(22) Filed: Sep. 18, 2019

(51) Int. Cl.
*H04L 12/24* (2006.01)
*H04L 12/939* (2013.01)
*G06F 16/903* (2019.01)

(52) U.S. Cl.
CPC ........ *H04L 41/12* (2013.01); *G06F 16/90335* (2019.01); *H04L 49/552* (2013.01)

(58) Field of Classification Search
CPC .................................................... H04L 45/02
USPC ......................................................... 709/223
See application file for complete search history.

(56) References Cited

U.S. PATENT DOCUMENTS

| | | | |
|---|---|---|---|
| 7,209,435 B1 * | 4/2007 | Kuo ........................ | H04L 45/00 370/219 |
| 9,081,989 B2 | 7/2015 | Lie et al. | |
| 9,699,150 B2 | 7/2017 | Lie et al. | |
| 10,114,667 B2 * | 10/2018 | Mizuno ................. | G06F 9/5077 |
| 10,761,895 B2 * | 9/2020 | Thankappan ......... | G06F 9/5077 |
| 2007/0189157 A1 * | 8/2007 | Andrews ................ | H04L 45/00 370/228 |
| 2009/0268608 A1 * | 10/2009 | Lobig ................. | H04L 65/1043 370/220 |
| 2011/0060826 A1 * | 3/2011 | Reister ................ | H04L 41/5077 709/224 |
| 2012/0051232 A1 * | 3/2012 | Nomura ................. | H04L 69/14 370/248 |
| 2014/0025833 A1 * | 1/2014 | Kiessling ................ | H04L 45/28 709/228 |
| 2015/0036480 A1 * | 2/2015 | Huang .................... | H04L 41/12 370/220 |
| 2015/0200803 A1 * | 7/2015 | Kashyap ............. | H04L 41/0668 370/217 |
| 2016/0019044 A1 * | 1/2016 | Stolarchuk ................ | G06F 8/63 717/171 |
| 2016/0202744 A1 | 7/2016 | Castro-Leon | |
| 2016/0285691 A1 * | 9/2016 | Aggarwal ............. | H04L 41/145 |
| 2017/0005919 A1 * | 1/2017 | Wang ...................... | H04L 12/64 |
| 2017/0068564 A1 | 3/2017 | Lubsey et al. | |
| 2018/0091426 A1 * | 3/2018 | Bao ........................ | H04L 43/16 |
| 2019/0190812 A1 * | 6/2019 | Verma .................... | H04L 45/50 |
| 2020/0336418 A1 * | 10/2020 | Jayaraj .................... | H04L 12/66 |

FOREIGN PATENT DOCUMENTS

EP          2672657 A1 * 12/2013     ............. H04L 41/12

* cited by examiner

*Primary Examiner* — Hamza N Algibhah (74) *Attorney, Agent, or Firm* — Ryan, Mason & Lewis, LLP (57) ABSTRACT

An information handling system such as a server, network switch, or virtual host collects electronic network topology data to identify topological redundancies between networked devices. Each topological redundancy indicates that a particular networked device has at least two physical cable connections to at least two other, separate devices. A topological redundancy to two network switches, for example, ensures that a networked device remains communicatively available should one of the network switches fail.

20 Claims, 7 Drawing Sheets

SYSTEM AND METHOD FOR TOPOLOGICAL REDUNDANCY

FIELD OF THE DISCLOSURE

The present disclosure generally relates to information handling systems, and more particularly relates to redundancy in switches and in other networked devices.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system collects electronic network topology data to identify topological redundancies between networked devices. Each topological redundancy indicates that a particular networked device has at least two physical cable connections to at least two other, separate devices. A topological redundancy to two network switches, for example, ensures that a networked device remains communicatively available should one of the network switches fail.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
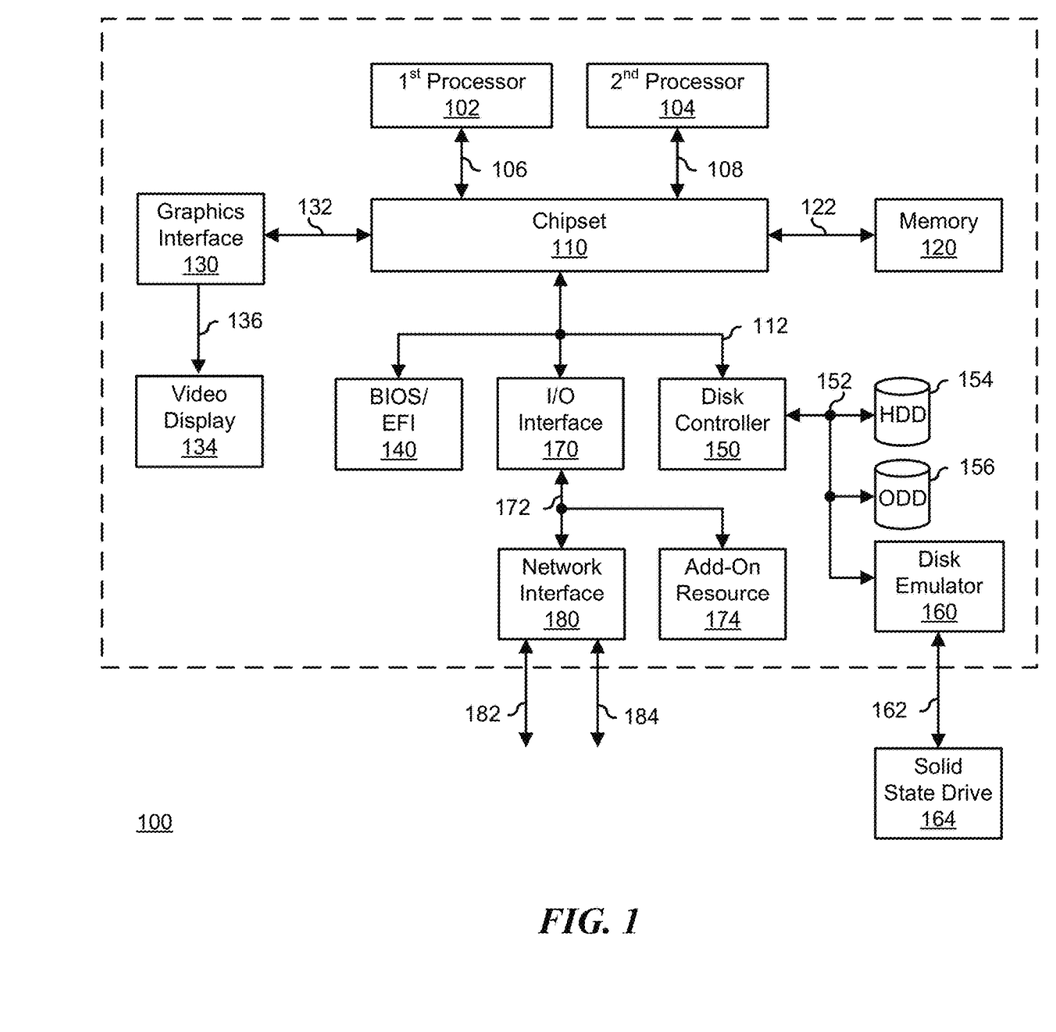
FIG. 1 is a schematic diagram illustrating an information handling system according to an embodiment of the present disclosure.

FIG. 1 illustrates a generalized embodiment of information handling system 100, according to exemplary embodiments. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes processors 102 and 104, a chipset 110, a memory 120, a graphics interface 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

The information handling system 100 may include a trusted platform module (or TPM) that implements a root of trust (or RoT). The trusted platform module 210 interfaces with an embedded controller (EC) (perhaps the chipset 110 and/or processors 102/104) to enforce cryptographic trust chaining on all boot components. The root of trust is responsible for initializing a manufacturer's and/or platform supplier's version of the trusted platform module (such as a discrete or dTPM), reading and measuring integrity with manufacturer/supplier-specific PKI keys for runtime firmware stored/located on the memory device 120 (such as a flash volume) and/or within the trusted platform module. The root of trust may build, load, access or query an anti-roll back (or ARB) version table that is also stored or maintained by the memory device 120 and/or within the trusted platform module. The root of trust may manage platform assets and may also manage a secure boot operation.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disc controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel 112 to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a peripheral card disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel 172 to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
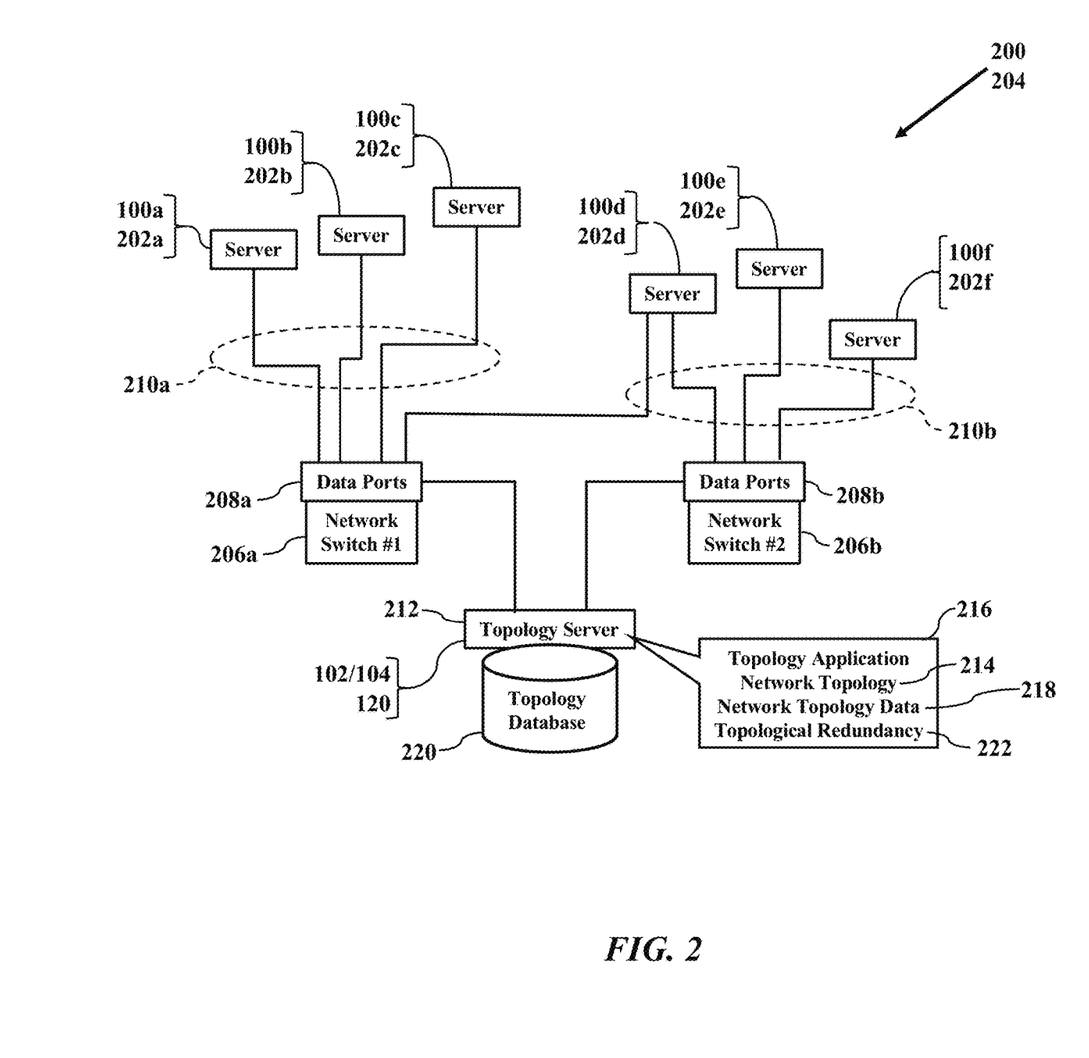
FIG. 2 is a schematic diagram illustrating a network of information handling systems, according to exemplary embodiments.

FIG. 2 illustrates a network 200 of information handling systems 100, according to exemplary embodiments. The information handling systems 100 are networked together as networked devices 202 via a communications network 204. While there may be many or even hundreds of the networked devices 202, FIG. 2 only illustrates a simple networking environment of servers connected to network switches 206. Some of the networked devices 100/202a-c, for example, are individually and separately connected to a first network switch 206a. Other ones of the networked devices 202e-f are individually and separately connected to the data ports 208b of a second network switch 206b. Notice, however, that network device 202d has physical connections to both the first network switch 206a and the second network switch 206b.

A topology server 212 determines a network topology 214 of the network 200. The topology server 212 has the hardware processor 102/104 that executes a topology application 216 stored in the memory device 120. The topology application 216 instructs the hardware processor 102/104 to collect and to store electronic network topology data 218 in an electronic topology database 220. FIG. 2 illustrates the electronic topology database 220 being locally stored in the topology server 212, but the electronic topology database 220 may be remotely stored and maintained by any of the networked devices 202, by any of the network switches 206, and/or by a remote network resource via a LAN or WAN. Regardless, the topology application 216 may instruct the hardware processor 102/104 to inspect the electronic network topology data 218 to determine a topological redundancy 222 for any one of the networked devices 202. That is, the topology application 216 causes the topology server 212 to determine whether any one of the networked devices 202 has at least two physical connections to at least two other, separate ones of the networked devices 202. Again, notice that the network device 202d has physical connections to both the first network switch 206a and to the second network switch 206b. Should a physical connection to the first network switch 206a fail, or should the first network switch 206a itself fail, then the topological redundancy 222 (provided by the second physical connection to the second network switch 206b) ensures that network device 202d remains communicatively available/reachable via the second network switch 206b.

Figure 3:
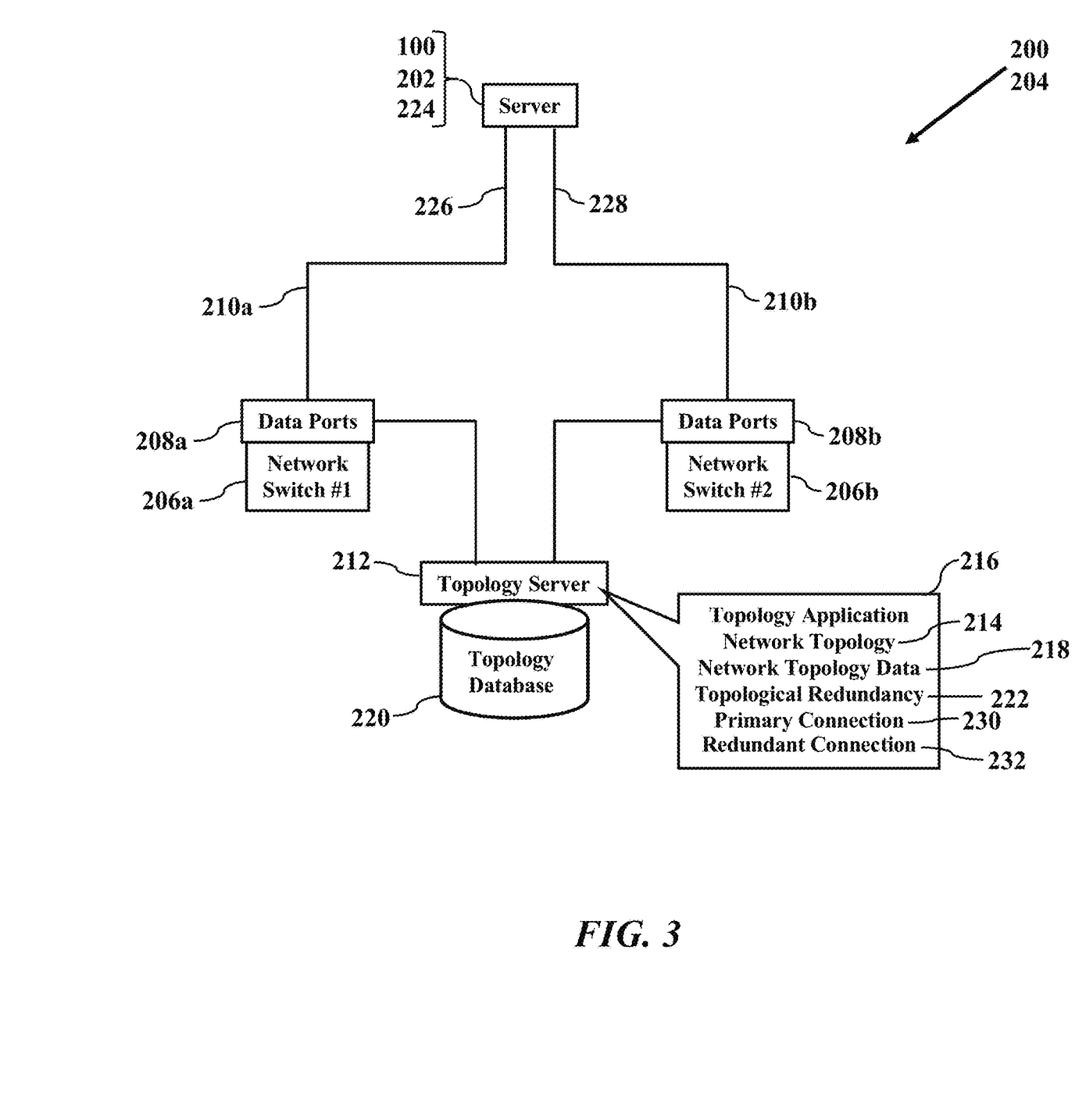
FIG. 3 is a schematic diagram illustrating a topological redundancy, according to exemplary embodiments.

FIG. 3 further illustrates the topological redundancy 222, according to exemplary embodiments. Suppose the networked device 202 (such as a server 224) has a first physical connection 226 via a first data cable 210a to one of the ports 208a of the first network switch 206a. Suppose also that the server 224 has a second physical connection 228 via a second data cable 210b to one of the ports 208b of the second packet data switch 206b. When the topology application 216 inspects the electronic network topology data 218, the topology application 216 may infer that the first physical connection 226 is a primary network connection 230, while the second physical connection 228 is a redundant network connection 232. If, for any reason, the primary connection 230 fails, the server 224 is still available via the second physical connection 228 (as the redundant connection 232). The server 224 exhibits the topological redundancy 222, thus ensuring that the server 224 is always available for read/write/query tasks.

Figure 4:
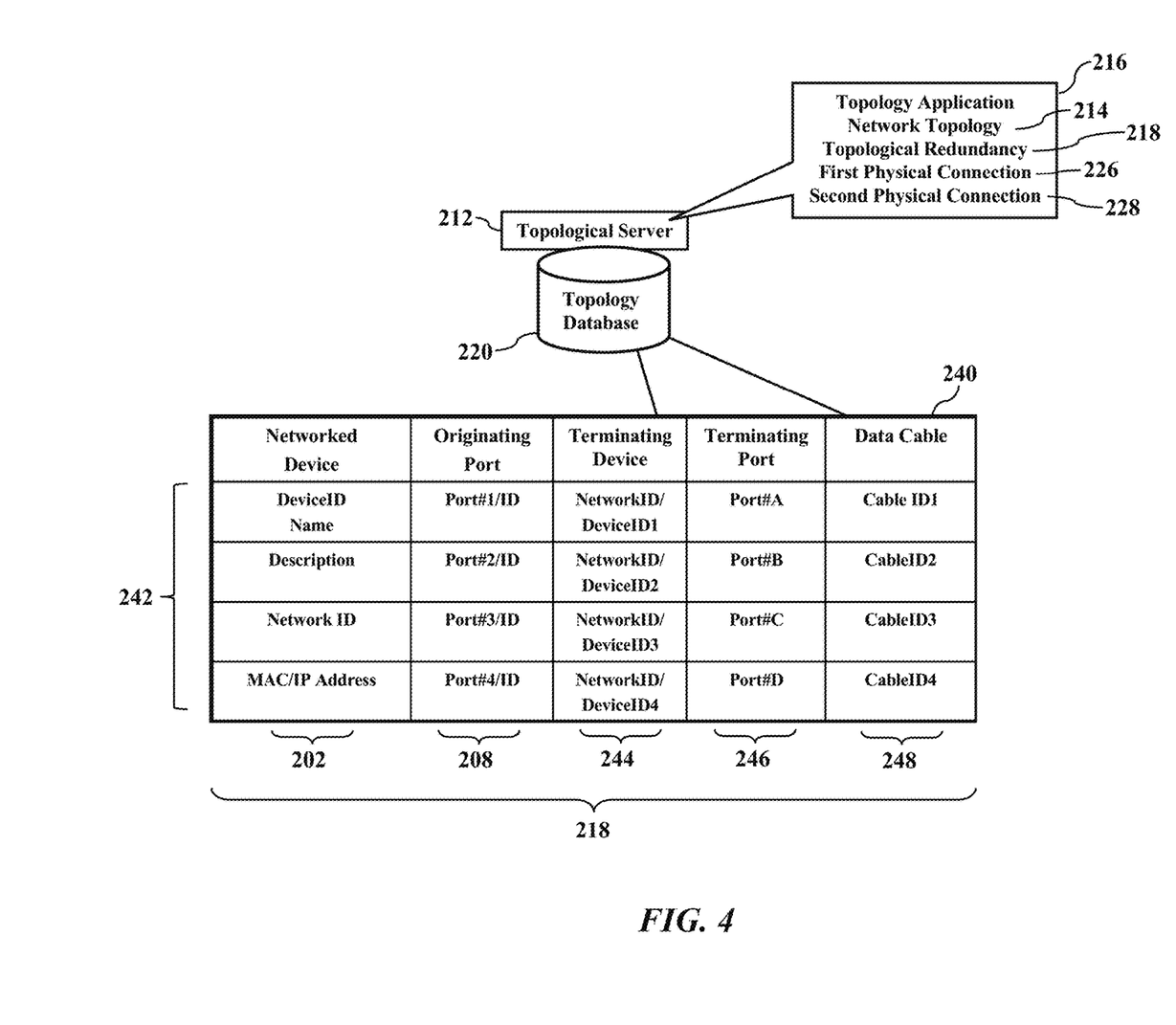
FIG. 4 is a schematic diagram illustrating an electronic topology database, according to exemplary embodiments.

FIG. 4 illustrates the electronic topology database 220, according to exemplary embodiments. The topology application 216 causes the topology server 212 to retrieve the electronic network topology data 218. For example, the topology server 212 may query any or each networked device 202 to retrieve its corresponding electronic network topology data 218. The topology server 212 may additionally or alternatively query the first network switch 206a and/or the second network switch 206b (illustrated in FIGS. 2-3) to retrieve their corresponding electronic network topology data 218. Whatever the source of the electronic network topology data 218, the topology server 212 may store the electronic network topology data 218 as database entries in the electronic topology database 220. While the electronic topology database 220 may have any logical structure, a relational database is perhaps easiest to understand. FIG. 4 thus illustrates the electronic topology database 220 as an electronic table 240 that maps, converts, or translates the electronic network topology data 218 to its corresponding networked device 202. Again, as a simple example, suppose the electronic topology database 220 has columns and rows that associate a device identifier 242 (such as a system name or network/IP/MAC address) to its corresponding ports 208 and to their respective physical connection(s) to a terminating device 244 and a terminating port 246. Each port connection, in other words, describes a port-to-port or end-to-end physical cable connection between two of the networked devices 202 (such as an originating device/port to a terminating device/port). The electronic topology database 220 may even have entries that describe the physical data cable (such as a cable identifier 248) that connects between the originating port 208 and the terminating port 246 of the terminating device 244. The topology server 212 may thus query the electronic topology database 220 for any query parameter and identify and/or retrieve the associated database entries. The electronic topology database 220 may be searched by the device identifier 242, by the originating port 208, by the data cable (such as the cable identifier 248), by the terminating port 246, and/or by the terminating device 244 to identify and retrieve the corresponding entries.

The topological redundancy 222 may then be determined. Once the topology server 212 has identified the electronic network topology data 218 for networked device 202, the topology application 216 causes the topology server 212 to determine whether the topological redundancy 222 exists. The topology server 212, for example, inspects the electronic network topology data 218 for port connections to at least two different and/or separate terminating devices 244. The columnar entries describing the terminating devices 244 may be quickly retrieved (perhaps as a list) and compared to determine the topological redundancy 222. The topology application 216 inspects the electronic network topology data 218 for the first physical connection 226 to a first terminating device 244 and for the second physical connection 228 to a different/separate second terminating device 244. Returning to FIG. 3, if both physical connections 226 and 228 are reported as normal states (such as OK, active), then the topology server 212 may infer that the server 224 has both the primary connection 230 and the redundant connection 232 to separate networked devices 202 (such as the network switches 206a and 206b). The topology server 212 has thus determined that the server 224 exhibits the topological redundancy 222 in network topology, so the server 224 is always available for read/write/query tasks.

Figure 5:
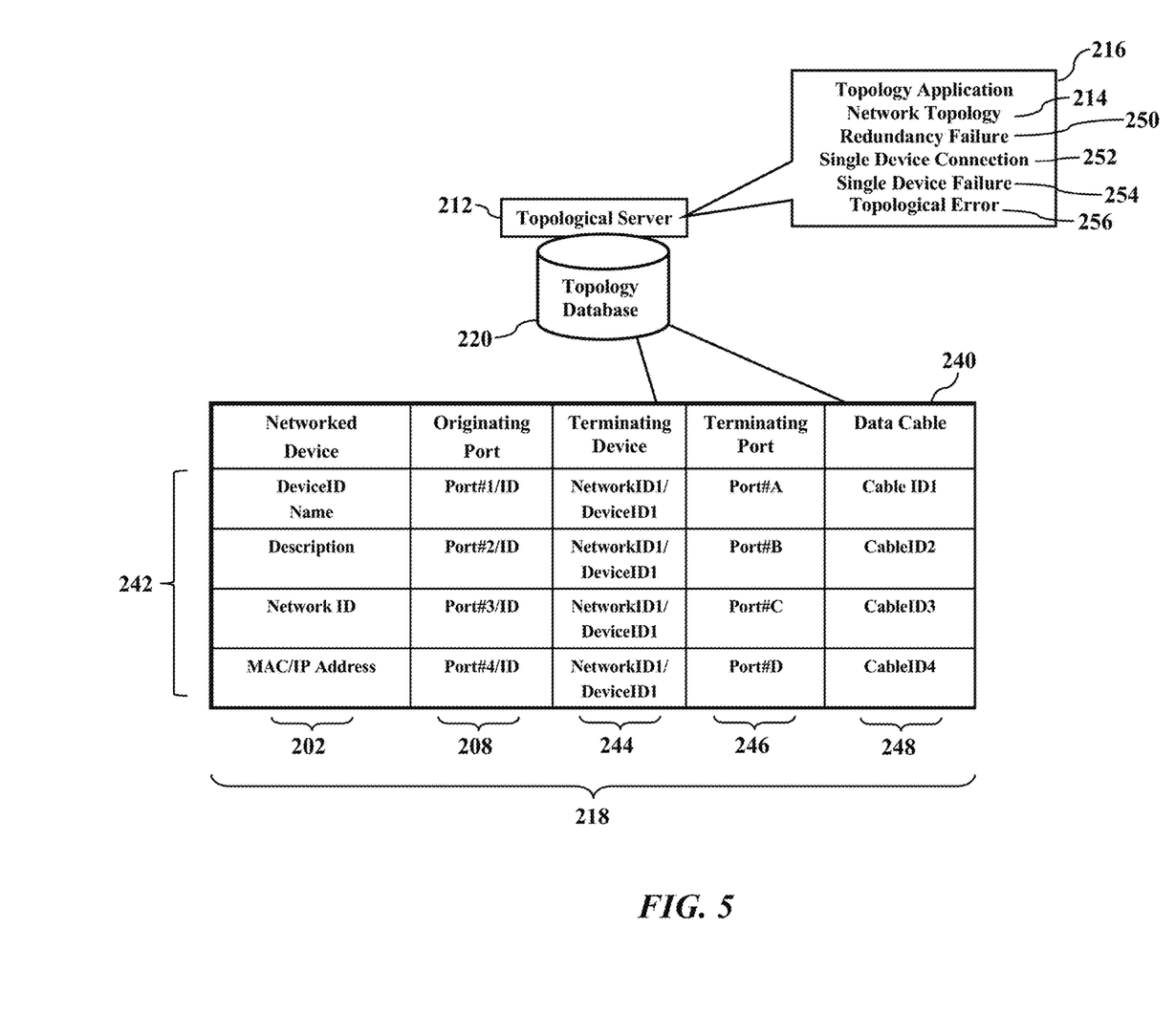
FIG. 5 is a schematic diagram illustrating a redundancy failure, according to exemplary embodiments.

FIG. 5 illustrates a redundancy failure 250, according to exemplary embodiments. When the topology server 212 inspects or compares the electronic network topology data 218 for any networked device 202, the topology server 212 may determine that the topological redundancy 222 is lacking. The networked device 202, in other words, has a single device connection 252 to a single other terminating device. The electronic network topology data 218, for example, may reveal that the networked device 202 is only connected to the first network switch 206a as illustrated in FIG. 2. The networked device 202 may even have multiple physical connections to the ports 208a of the same first network switch 206a. That is, even though the networked device 202 may have multiple or many physical connections to the first network switch 206a, all those physical connections are susceptible to a single device failure 254. Should the first network switch 206a fail, for any reason, then all the physical connections are likely down and unavailable, rendering the networked device 202 unavailable to its network members. If the electronic network topology data 218 indicates one, or even many port connections, to a single device (such as the first network switch 206a), then the topology server 212 may infer the redundancy failure 250. The topology application 216 may even cause the topology server 212 to flag a topological error 256 and notify human personnel (perhaps via electronic or SMS message) for investigation and resolution.

The electronic network topology data 218 may utilize any network topological data. For example, exemplary embodiments may utilize the Link Layer Discovery Protocol (or LLDP). This LLDP protocol is a vendor-neutral link layer protocol that may be used by the network devices 202 for advertising their identity, capabilities, and neighbors within the network 204 according to the Station and Media Access Control Connectivity Discovery specified by IEEE 802. The electronic network topology data 218 may be stored in a device management information database (such as the electronic topology database 220) and queried using the Simple Network Management Protocol. The LLDP may describe the device identifier 242, the port connection(s) (for example, names and descriptions, such as the originating port 208, the terminating port 246, and/or the terminating device 244), network name, IP address, system capabilities, MAC/PHY information, MDI power, and link aggregation. Exemplary embodiments may also utilize the Cisco® Discovery Protocol® that shares information about other directly connected Cisco® equipment.

Figure 6:
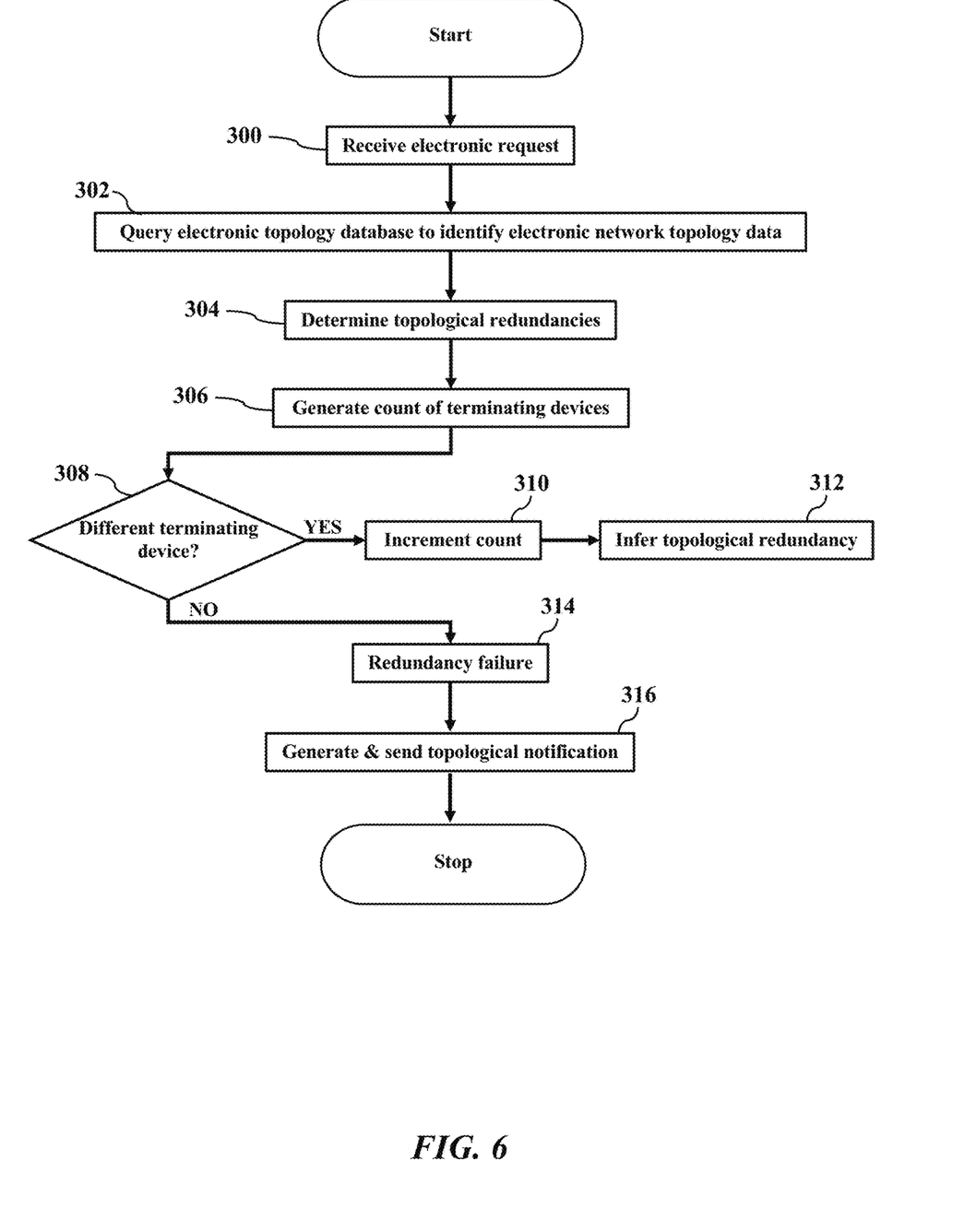
FIG. 6 is a flowchart showing an algorithm or method of determining the topological redundancy, according to exemplary embodiments.

FIG. 6 shows an algorithm or method of determining the topological redundancy 222, according to exemplary embodiments. An electronic request is received that requests the topological redundancy 222 between the networked devices 202 (Block 300). The electronic request may be received by any device or host that acts as a query handler for analyzing the electronic network topology data 218. For simplicity, this disclosure assumes that the electronic request is received by the topology server 212.

The electronic request may source or originate from any networked location or service. For example, any of the networked devices 202 may generate and send the electronic request. The electronic request may additionally or alternatively originate or source from any device accessible via the communications network 204 (such as a management or an administrative server or device or a cloud-based service). The topology application 216 may even cause the topology server 212 to periodically or randomly generate the electronic request. The electronic request may include or specify one or more query parameters, such as one or more device identifiers 242, one or more originating ports 208, and/or one or more terminating devices 244 and/or terminating ports 246. The electronic request may have any formatting that requests redundant physical uplinks between any two of the networked devices 202.

The electronic topology database 220 may then be consulted. Once the electronic request is received, the electronic topology database 220 is queried to identify the electronic network topology data 218 (Block 302). The topology server 212, for example, may query the electronic topology database 220 for the query parameter(s) specified by the electronic request. The topology application 216 causes the topology server 212 to identify the electronic network topology data 218 that is mapped, related to, or associated with the query parameter(s) specified by the electronic request. As an example, if the query parameter specified the device identifier 242 that corresponds to a particular one of the networked devices 202, then the corresponding electronic network topology data 218 is identified for that particular one of the networked devices 202. The topology server 212 may thus identify and/or retrieve the port connections (e.g., the originating port 208, the terminating port 246, and/or the terminating device 244) that are stored, maintained, registered, or logged in the electronic topology database 220. The topology server 212 may identify and/or retrieve any LLDP or CDP information that is reported for the particular one of the networked devices 202.

One or more of the topological redundancies 218 may then be determined (Block 304). Once the electronic network topology data 218 is identified, the topology application 216 causes the topology server 212 to determine whether any topological redundancies 218 exist. The LLDP or CDP information, for example, reveals the port connection(s) between different/separate networked devices 202. As the electronic network topology data 218 is compared, the topology application 216 may simply generate a count of the terminating devices 244 (Block 306). If two terminating devices 244 (such as terminating device identifiers) differ (Block 308), then the topology application 216 may increment the count of the terminating devices 244 (Block 310). When the count of the terminating devices 244 equals or exceeds two, then electronic network topology data 218 indicates that the networked device 202 has at least two physical connections to at least two separate networked devices 202 (and perhaps that each of the at least two physical connections have a normal, OK, or active status). The topology server 212 may infer or determine that the topological redundancy 222 exists for that networked device 202 (Block 312). However, if the electronic network topology data 218 indicates that the networked device 202 is only connected to a single terminating device 244 (Block 308), then the topology server 212 may infer the redundancy failure 250 (Block 314). The topology server 212 may generate a topological notification (Block 316). While the redundancy failure 250 and the topological notification may have any visual and audible form, most readers are familiar with electronic mail, a Short Messaging System (SMS) text message, and/or a web page pop-up alert. Human personnel are alerted to initiate an investigation and resolution.

Figure 7:
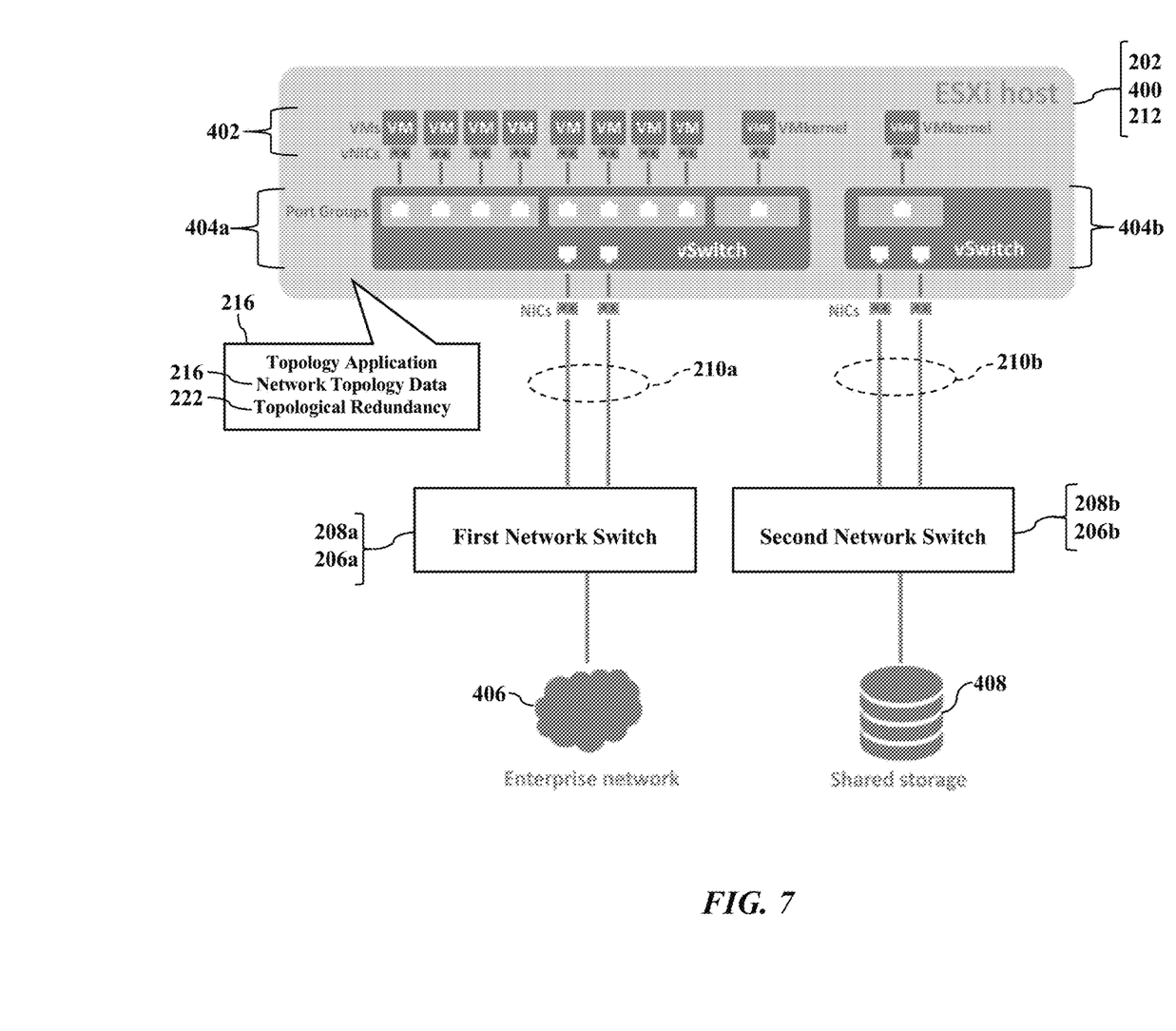
FIG. 7 is a schematic diagram illustrating the topological redundancy in virtual networking, according to exemplary embodiments.

FIG. 7 illustrates virtual networking, according to exemplary embodiments. As the reader may understand, exemplary embodiments may be applied to virtual networking. For example, the networked device 202 may be a virtual hosting device (such as ESXi host server 400 acting as the topology server 212) executing multiple virtual machines 402 and/or one or more virtual switches 404. The virtual machines 402 and the virtual switch 404a connect via the physical data cables 210a to the ports 208a of the first network switch 206a. The virtual machines 402 and the virtual switch 404b connect via the physical data cables 210b to the ports 208b of the second network switch 206b. The first network switch 206a may also connect to a WAN (such as an enterprise communications network 406), and the second network switch 206b may also connect to shared data storage 408. Because the virtual switches 404a-b may have hundreds or even thousands of physical and/or virtual ports, the reader may appreciate the complexity of physical and virtual network topologies and the corresponding complexity of the electronic network topology data 218. The ESXi host server 400 may thus request that any of the uplink virtual switches 404a-b provide their electronic network topology data 218 (such as LLDP or CDP information). The ESXi host server 400 (perhaps executing the topology application 216) may use the electronic network topology data 218 to allocate physical uplink connections to any number of the virtual machines 402 and/or the virtual switches 404 based on a simple business or programming logical framework of the topological redundancy 222. Moreover, the topological redundancy 222 also simplifies the physical connectivity requirements down to simple logical rule statements (such as inspecting/comparing the electronic network topology data 218 according to a logical rule "ESXi uplinks should target two or more different switches for the physical connections"). The below logical framework generally describes processing the electronic network topology data 218 to determine the topological redundancy 222:
request list of redundant ESXi physical uplinks;
system queries host (or set of hosts) for redundant uplinks via LLDP/CDP information; and
returns redundant uplink info based on LLDP/CDP information.
<SwitchID>: Vmnic0, vmnic2; <SwitchID>: vmnic1, vmnic3, vmnic4.
This approach is less error prone from a human standpoint when physically cabling these systems based on static cabling data.

Exemplary embodiments thus present an elegant solution. A conventional approach generates a static map of server ports to switch ports (such as a Data Center Inventory Infrastructure Manager or DCIM). A cable validation is performed based on this static mapping and will simply fail, thus requiring human intervention to correct cabling mismatches based on static information. The conventional approach creates a cascading failure and may be multiplied by the amount of cabling mistakes compared to statically defined data. However, by utilizing the dynamic and nearly real-time electronic network topology data 218, exemplary embodiments generate simple cable validations by inspecting for redundant and non-redundant port connections without human intervention. Should exemplary embodiments find an open port in a particular switch, exemplary embodiments may identify the open port (e.g., the originating port 208 and/or the terminating port 246. A human administrator or technician may thus proceed to the identified networked device 202 and resolve the open port, if needed.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
   receiving, by a hardware processor, electronic network topology data describing physical connections between a plurality of networked devices, the plurality of networked devices comprising at least one virtual hosting device, the at least one virtual hosting device executing a plurality of virtual computing resources, the plurality of virtual computing resources comprising (i) two or more virtual machines and (ii) two or more virtual switches;
   determining, based on the electronic network topology data describing the physical connections, whether a given one of the plurality of virtual computing resources executing on the at least one virtual hosting device is allocated physical uplinks corresponding to at least two of the physical connections to at least two different ones of the plurality of networked devices;
   determining that the given virtual computing resource executing on the at least one virtual hosting device has a topological redundancy in response to determining that the electronic network topology data describes that the given virtual computing resource executing on the at least one virtual hosting device is allocated physical uplinks corresponding to the at least two of the physical connections to the at least two different ones of the plurality of networked devices; and
   allocating at least one additional physical uplink to the given virtual computing resource executing on the at least one virtual hosting device to create a topological redundancy in response to determining that the electronic network topology data does not describe that the given virtual computing resource executing on the at least one virtual hosting device is allocated physical uplinks corresponding to the at least two of the physical connections to the at least two different ones of the plurality of networked devices.

2. The method of claim 1, further comprising determining whether the electronic network topology data describes a first physical connection of the physical connections between the given virtual computing resource executing on the at least one virtual hosting device and a first network switch of the plurality of networked devices.

3. The method of claim 2, further comprising determining whether the electronic network topology data describes a second physical connection of the physical connections between the given virtual computing resource executing on the at least one virtual hosting device and a second network switch of the plurality of networked devices, the second network switch different from the first network switch.

4. The method of claim 1, further comprising comparing the electronic network topology data describing an originating device and a terminating device.

5. The method of claim 1, further comprising comparing the electronic network topology data describing an originating communications port and a terminating communications port.

6. The method of claim 1, further comprising comparing the electronic network topology data describing terminating devices to determine the at least two of the physical connections.

7. The method of claim 1, further comprising receiving an electronic request to determine the topological redundancy.

8. A system, comprising:
a hardware processor; and
a memory device accessible to the hardware processor, the memory device storing instructions that when executed cause the hardware processor to perform operations including:
receiving electronic network topology data describing physical connections between a plurality of networked devices, the plurality of networked devices comprising at least one virtual hosting device, the at least one virtual hosting device executing a plurality of virtual computing resources, the plurality of virtual computing resources comprising (i) two or more virtual machines and (ii) two or more virtual switches;
determining, based on the electronic network topology data describing the physical connections, whether a given one of the plurality of virtual computing resources executing on the at least one virtual hosting device is allocated physical uplinks corresponding to at least two of the physical connections to at least two different ones of the plurality of networked devices;
determining that the given virtual computing resource executing on the at least one virtual hosting device has a topological redundancy in response to determining that the electronic network topology data describes that the given virtual computing resource executing on the at least one virtual hosting device is allocated physical uplinks corresponding to the at least two of the physical connections to the at least two different ones of the plurality of networked devices; and
allocating at least one additional physical uplink to the given virtual computing resource executing on the at least one virtual hosting device to create a topological redundancy in response to determining that the electronic network topology data does not describe that the given virtual computing resource executing on the at least one virtual hosting device is allocated physical uplinks corresponding to the at least two of the physical connections to the at least two different ones of the plurality of networked devices.

9. The system of claim 8, wherein the operations further comprise querying an electronic database to retrieve the electronic network topology data.

10. The system of claim 8, wherein the operations further comprise determining whether the electronic network topology data describes a first physical connection of the physical connections between the given virtual computing resource executing on the at least one virtual hosting device and a first network switch of the plurality of networked devices.

11. The system of claim 10, wherein the operations further comprise determining whether the electronic network topology data describes a second physical connection of the physical connections between the given virtual computing resource executing on the at least one virtual hosting device and a second network switch of the plurality of networked devices, the second network switch different from the first network switch.

12. The system of claim 8, wherein the operations further comprise comparing the electronic network topology data describing an originating device and a terminating device.

13. The system of claim 8, wherein the operations further comprise comparing the electronic network topology data describing an originating communications port and a terminating communications port.

14. The system of claim 8, wherein the operations further comprise comparing the electronic network topology data describing terminating devices to determine the at least two of the physical connections.

15. A memory device storing instructions that when executed cause a network interface card to perform operations comprising:
receiving electronic network topology data describing physical connections between a plurality of networked devices, the plurality of networked devices comprising at least one virtual hosting device, the at least one virtual hosting device executing a plurality of virtual computing resources, the plurality of virtual computing resources comprising (i) two or more virtual machines and (ii) two or more virtual switches;
determining, based on the electronic network topology data describing the physical connections, whether a given one of the plurality of virtual computing resources executing on the at least one virtual hosting device is allocated physical uplinks corresponding to at least two of the physical connections to at least two different ones of the plurality of networked devices;
determining that the given virtual computing resource executing on the at least one virtual hosting device has a topological redundancy in response to determining that the electronic network topology data describes that the given virtual computing resource executing on the at least one virtual hosting device is allocated physical uplinks corresponding to the at least two of the physical connections; and
allocating at least one additional physical uplink to the given virtual computing resource executing on the at least one virtual hosting device to create a topological redundancy in response to determining that the electronic network topology data does not describe that the given virtual computing resource executing on the at least one virtual hosting device is allocated physical uplinks corresponding to the at least two of the physical connections to the at least two different ones of the plurality of networked devices.

16. The memory device of claim 15, wherein the operations further comprise identifying terminating devices described by the electronic network topology data having the physical connections to the given virtual computing resource executing on the at least one virtual hosting device.

17. The memory device of claim 16, wherein the operations further comprise generating a count of the terminating devices described by the electronic network topology data having the physical connections to the given virtual computing resource executing on the at least one virtual hosting device.

18. The memory device of claim 17, wherein the operations further comprise inferring that the given virtual computing resource executing on the at least one virtual hosting device has the topological redundancy in response to the count of the terminating devices being equal to or greater than two.

19. The memory device of claim 15, wherein the operations further comprise querying an electronic database to retrieve the electronic network topology data.

20. The memory device of claim 15, wherein the operations further comprise comparing the electronic network topology data describing an originating communications port and a terminating communications port.

\* \* \* \* \*